(12) United States Patent
Kim

(10) Patent No.: US 9,487,626 B2
(45) Date of Patent: Nov. 8, 2016

(54) CARBON DIOXIDE FIXATION METHOD USING CONDENSATION POLYMERIZATION, POLYMER MATERIAL PREPARED THEREBY, METHOD FOR RECOVERING CARBON FROM SAID POLYMER MATERIAL, AND GRAPHITE GENERATED BY SAID CARBON RECOVERY METHOD

(71) Applicant: POSTECH ACADEMY-INDUSTRY FOUNDATION, Gyeongsangbuk-do (KR)

(72) Inventor: Jang-Gyu Kim, Seoul (KR)

(73) Assignee: POSTECH ACADEMY-INDUSTRY FOUNDATION, Pohang-Si, Gyeongsangbuk-Do (KR)

( * ) Notice: Subject to any disclaimer, the term of this patent is extended or adjusted under 35 U.S.C. 154(b) by 0 days.

(21) Appl. No.: 14/365,817

(22) PCT Filed: Dec. 4, 2012

(86) PCT No.: PCT/KR2012/010417
§ 371 (c)(1),
(2) Date: Jun. 16, 2014

(87) PCT Pub. No.: WO2013/089380
PCT Pub. Date: Jun. 20, 2013

(65) Prior Publication Data
US 2014/0308196 A1 Oct. 16, 2014

(30) Foreign Application Priority Data
Dec. 15, 2011 (KR) .......................... 10-2011-0135234
Jun. 27, 2012 (KR) .......................... 10-2012-0068934

(51) Int. Cl.
| | | |
|---|---|---|
| *C08G 64/30* | (2006.01) | |
| *C01B 31/04* | (2006.01) | |
| *C01B 31/02* | (2006.01) | |
| *C08G 64/02* | (2006.01) | |

(52) U.S. Cl.
CPC ............... *C08G 64/30* (2013.01); *C01B 31/02* (2013.01); *C01B 31/04* (2013.01); *C08G 64/0208* (2013.01); *Y02P 20/142* (2015.11)

(58) Field of Classification Search
CPC .. C08G 64/30; C08G 64/0208; C01B 31/02; C01B 31/04
See application file for complete search history.

(56) References Cited

FOREIGN PATENT DOCUMENTS

| | | | |
|---|---|---|---|
| JP | WO 2010150793 A1 * | 12/2010 | ............ B01J 21/063 |
| KR | 10-2006-23206 A | 3/2006 | |

OTHER PUBLICATIONS

Sakakura, Toshiyasu, and Kazufumi Kohno. "The synthesis of organic carbonates from carbon dioxide." Chemical Communications 11 (2009): 1312-1330.*

(Continued)

*Primary Examiner* — Richard M Rump
(74) *Attorney, Agent, or Firm* — Revolution IP, PLLC

(57) ABSTRACT

This invention relates to a method of fixing carbon dioxide by condensation polymerization in an acidic aqueous medium, thereby increasing fixation efficiency and remarkably reducing the volume of generated material compared to conventional carbon dioxide fixation methods; a polymer material prepared by the method; and a method of recovering carbon therefrom. According to the current invention, the method of fixing carbon dioxide is characterized by introducing carbon dioxide pressurized to a pressure higher than atmospheric pressure into a reactor containing a acidic aqueous medium, so that carbonic acid resulting from dissolving carbon dioxide is made into a polymer material by condensation polymerization, thereby fixing carbon dioxide, and heating the polymer material so as to recover carbon.

10 Claims, 2 Drawing Sheets

(56) References Cited

OTHER PUBLICATIONS

Yoon, Bokwon, et al. "Diffusion of gold clusters on defective graphite surfaces." The Journal of Physical Chemistry B 107.24 (2003): 5882-5891.*

Makomaski, Grzegorz, et al. "Waste Polycarbonate as Precursor for Activated Carbons."*
English machine translation of WO2010150793A1.*
International Search Report for PCT/KR2012/010417.

* cited by examiner

CARBON DIOXIDE FIXATION METHOD USING CONDENSATION POLYMERIZATION, POLYMER MATERIAL PREPARED THEREBY, METHOD FOR RECOVERING CARBON FROM SAID POLYMER MATERIAL, AND GRAPHITE GENERATED BY SAID CARBON RECOVERY METHOD

CROSS REFERENCE TO RELATED APPLICATIONS AND CLAIM OF PRIORITY

This patent application is a National Phase application under 35 U.S.C. §371 of International Application No. PCT/KR2012/010417, filed 4 Dec. 2012, which claims priority to Korean Patent Application Nos. 10-2011-0135234 filed 15 Dec. 2011, and 10-2012-0068934 filed 27 Jun. 2012, entire contents of which are incorporated herein by reference.

TECHNICAL FIELD

The present invention relates to a method of fixing carbon dioxide, a polymer material prepared thereby and a method of recovering carbon from the polymer material, and more particularly, to a method of fixing carbon dioxide, wherein carbon dioxide may be more efficiently and cheaply fixed by condensation polymerization in an acidic aqueous medium, compared to conventional carbon dioxide fixation methods; a polymer material prepared by the method; and a method of recovering carbon from the polymer material so as to enable cyclic utilization of carbon, exploiting the oxygen elimination tendency of the solidified carbon dioxide compared to gaseous carbon dioxide.

BACKGROUND ART

Fossil fuel such as oil or coal is an energy source essential to mankind, but generates a large amount of carbon dioxide ($CO_2$) during the use thereof, undesirably causing global warming and serious climate change. Accordingly, mandatory $CO_2$ emission regulations will be applied in the future. Moreover, although a variety of energy sources have been developed to replace fossil fuel, the International Energy Agency (IEA) has reported that in terms of total energy demand, fossil fuel will fill 70% or more of the demand through 2050.

Thorough research around the world is ongoing into the reduction of carbon dioxide and the fixation and storage of carbon dioxide in facilities, such as large petrochemical plants, thermal power plants and steel mills, where a large amount of carbon dioxide is emitted at high concentration. The currently available carbon dioxide fixation methods involve dissolving carbon dioxide in water to store it, compressing carbon dioxide to store it in the deep seabed, storing carbon dioxide in tunnels, photosynthesizing carbon dioxide using algae, or precipitating carbon dioxide into calcium carbonate.

However, these conventional carbon dioxide fixation methods are problematic because the fixation efficiency of carbon dioxide is low, and the large volume of the material produced in this procedure needs a large storage space, or because high cost is required to perform fixation and storage of carbon dioxide. Furthermore, it is difficult to accomplish cyclic utilization of resources including fixation of carbon dioxide and recycling of carbon from fixed carbon dioxide. Such methods are not regarded as a fundamental solution of carbon dioxide problems.

For example, the following Patent Document 1 discloses a method of fixing carbon dioxide, wherein slag as a byproduct of a steel making process is reacted with carbon dioxide so that carbon dioxide is fixed on the surface of slag, and thus the slag having fixed carbon dioxide functions to prevent formation of high alkaline dissolved water, colored water, and cloudy water and precipitates and is thereby used as aggregate for public works. However, this method suffers because limitations are imposed on materials able to fix carbon dioxide and carbon resources of fixed carbon dioxide cannot be reused.

SUMMARY

A first object of the present invention is to provide a method of fixing carbon dioxide, which enables the fixation efficiency of carbon dioxide to increase and the volume of a fixed material to be minimized.

A second object of the present invention is to provide a polymer material produced by the method of fixing carbon dioxide.

A third object of the present invention is to provide a method of recovering carbon from the polymer material produced by the fixation of carbon dioxide, without the use of an additional material.

A fourth object of the present invention is to provide graphite recovered from the polymer material produced by the fixation of carbon dioxide.

In order to accomplish the first object, a first aspect of the present invention provides a method of fixing carbon dioxide, comprising introducing carbon dioxide pressurized to a pressure higher than atmospheric pressure into an acidic aqueous medium, so that carbonic acid resulting from dissolving carbon dioxide in the acidic medium is made into a polymer material by condensation polymerization.

In the first aspect of the present invention, the temperature of the reactor may be 100° C. or less, and is preferably 0 to 100° C.

In the first aspect of the present invention, the pressure of carbon dioxide may be 30 atm or more, and is preferably 30 to 100 atm.

In the first aspect of the present invention, the acidification can be done with one or more selected from among sulfuric acid, nitric acid, hydrochloric acid, and any inorganic or organic acids.

In the first aspect of the present invention, the polymer material may be a material represented by the following Chemical Formula and a derivative in which a functional group thereof is partially substituted with another functional group.

[Chemical Formula]

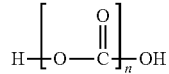

In the first aspect of the present invention, the polymer material may be configured such that carbon atoms of linear molecules are partially cross-linked and thus the linear molecules are connected to each other via chemical bonding.

A second aspect of the present invention for accomplishing the second object provides a polymer material synthesized by the method according to the first aspect of the present invention.

A third aspect of the present invention for accomplishing the third object provides a method of recovering carbon, comprising heating the polymer material synthesized according to the second aspect of the present invention, thus separating oxygen and recovering carbon, from the polymer material.

In the third aspect of the present invention, heating the polymer material may be performed at 500 to 1100° C., and is preferably carried out at 550 to 700° C.

In the third aspect of the present invention, the polymer material may include a carboxyl group and a hydroxyl group.

A fourth aspect of the present invention for accomplishing the fourth object provides graphite recovered according to the third aspect of the present invention.

In the fourth aspect of the present invention, graphite may include a defective structure.

According to the present invention, carbon dioxide can be made into a polymer material by merely increasing the pressure of carbon dioxide at 100° C. or less, thus fixing carbon dioxide at much lower cost while having a lower influence on nature, compared to conventional carbon dioxide fixation methods for storing liquefied carbon dioxide in the seabed or underground.

Also, according to the present invention, the polymer compound of carbon dioxide fixed using condensation polymerization shows the tendency of eliminating oxygen, and thereby oxygen can be removed with thermal activation, and carbon can be recycled in the form of graphite, thus achieving efficient fixation of carbon dioxide and a carbon cycle. Accordingly, carbon is combusted to thus obtain higher quality energy, and carbon dioxide generated in this procedure is pressurized and thus concentrated, solidified by condensation polymerization, and then recycled into carbon using lower temperature energy obtained by other methods such as wind power or solar light, ultimately constructing a cyclic utilization system of resources able to solve global warming problems due to carbon dioxide and also able to prevent exhaustion of carbon resources.

DETAILED DESCRIPTION

Figure 1:
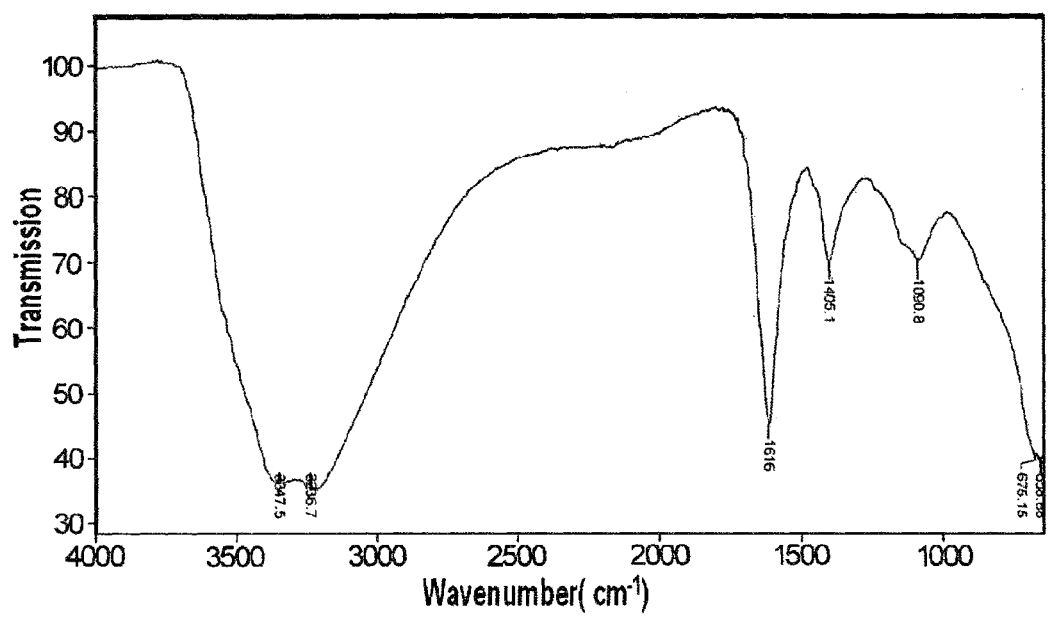
FIG. 1 illustrates an infrared (IR) absorption spectrum of a synthesized material according to an embodiment of the present invention.

Hereinafter, a detailed description will be given of preferred embodiments of the present invention with reference to the appended drawings. However, these embodiments are provided so as to be sufficiently understood by those having ordinary knowledge in the art and may be variously modified, and the scope of the present invention is not construed to the following.

Carbon dioxide is present in the form of an acid having a carboxyl group in an aqueous solution. It has the form of carboxylic acid and is referred to as carbonic acid. The hydroxyl group of this carbonic acid is allowed to function as an alcohol group, unlike other carboxylic acids.

The present inventor has noticed this fact and found that, when carbon dioxide is subjected to condensation polymerization, it may be made into a stable material through the reaction of only carbon dioxide with little or no use of other materials, thus considerably reducing the cost compared to conventional carbon dioxide fixation methods.

Esterification becomes possible through the reaction between carbonic acids, as shown in the following Chemical Formula 1.

[Chemical Formula 1]

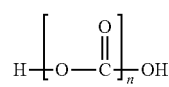

When the aforementioned reaction is continuously carried out in an aqueous solution, condensation polymerization (polycondensation) takes place, thereby obtaining a linear polycarbonic acid molecule by the reaction of carbonic acid molecules, as shown in the following Chemical Formula 2.

[Chemical Formula 2]

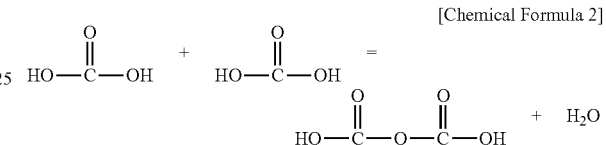

This molecular formula may be simply represented by the following Chemical Formula 3, wherein the portion in brackets designates the repeating unit, and the subscript n designates the number of repeating units which are connected to each other.

[Chemical Formula 3]

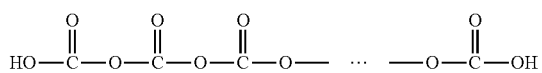

As esterification takes place under the condition that a large amount of hydrogen ions are present, there is a need of an acidic catalyst to supply a large amount of hydrogen ions in the present invention.

Also, the reaction has to occur in an aqueous solution to dissociate the acid, and the reaction material should be water-soluble. Because carbonic acid resulting from dissolving carbon dioxide in water is a weak acid, water solubility thereof is remarkably lower than that of the strong acids, and moreover, carbon dioxide is very stable when in a gas phase and hardly dissolves in an acidic aqueous solution at low partial pressure.

In order to increase water-solubility of carbon dioxide to induce condensation polymerization, the partial pressure of carbon dioxide should be increased. Carbon dioxide has to have a partial pressure far above the atmospheric pressure to achieve the significant reaction rate. Even if the partial pressure thereof exceeds 100 atm, it has no longer influence on condensation polymerization. Hence, the partial pressure is preferably maintained at 30 to 100 atm.

Meanwhile, carbon dioxide which is polymerized and stable in a solid phase according to the present invention may exhibit specific behavior. Carbon can be present in an elemental state which is not oxidized in nature. This is because carbon atoms can make stable solid structure and cannot be stable in solid state in oxidized form. Graphite or diamond is an example of carbon atoms which are linked with each other and may thus exist in a stable solid form. Diamond is a material having a three-dimensional network. Also, graphite is a material having a two-dimensional network and configured such that planar shapes overlap with each other. Graphite is regarded as stable but not as much as diamond. For this reason, solid carbon (graphite or diamond) exhibits relatively higher ignition temperature, compared to the other fuels.

Silicon which belongs to the same group as carbon is not present in an element state in nature. Silicon is combined with oxygen and exists as a stable crystal phase such as quartz. This is because silicon has a stable oxidized solid structure, and this difference between carbon and silicon stems from atomic size difference. When oxygen atoms are inserted between silicon atoms, a larger number of atoms per unit volume may be provided and thereby decreasing the energy of electrons to consequently manifest stabilization effects. Moreover, silicon cannot make double bond with oxygen so that the only form oxidized silicon takes is the solid polymer.

However, carbon has a smaller atomic size than oxygen. Whereas oxygen may have only two covalent bonds, carbon dioxide may form four chemical bonds. Consequently, the existence of oxygen atoms between carbon atoms means the destabilized structure. With another fact that carbon and oxygen can make double bond, carbon dioxide does not make polymer. Accordingly, once the polymer solid carbon dioxide is formed it has tendency to eliminate carbon with thermal activation.

Although it is difficult to form the diamond, the graphite is comparatively easily made. Hence, theoretical analysis may be deduced, in which when carbon dioxide is solidified, it may be more easily made into graphite, compared to the direct conversion of the gaseous carbon dioxide.

Based on such theoretical analysis, the present inventor has paid attention to the potential to recycle carbon when thermal energy is applied to the polymer compound of carbon dioxide prepared by condensation polymerization, and have proven that when the polymer compound is heated to a predetermined temperature, the reaction as shown in Chemical Formula 4 below occurs.

[Chemical Formula 4]

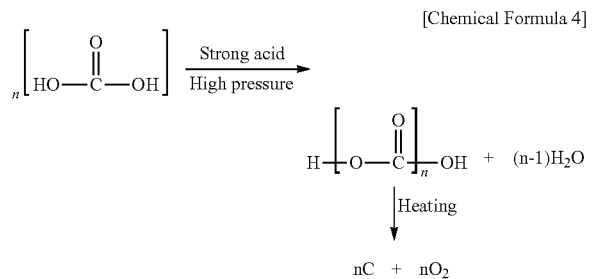

In order to carry out the reaction as shown in Chemical Formula 4, the polymer material synthesized by condensation polymerization should be heated to at least 500° C. This is because the elimination of oxygen atoms seldom occurs at low temperatures, and decomposition of the solid to the gaseous carbon dioxide mainly takes place at a temperature lower than 500° C.

The preferred heating temperature is 550 to 1100° C. If the heating temperature is lower than 500 to 550° C., elimination of oxygen and decomposition of carbon dioxide occur together, undesirably lowering the carbon recovery efficiency. In contrast, if the heating temperature is too high, the use of thermal energy may increase, undesirably raising the recovery cost.

Below is a description of the best mode for embodying the present invention.

Hydrochloric acid and water (distilled water) were mixed, thus preparing a hydrochloric acid aqueous solution at pH 1.5. The hydrochloric acid aqueous solution was placed in an autoclave which is a high-pressure reactor. Subsequently, carbon dioxide was introduced into the autoclave and pressurized to 60 atm. The temperature of the autoclave was set to room temperature. Consequently, a polymer material having a concentration of approximately 1% was synthesized.

FIG. 1 illustrates the IR absorption spectrum for analyzing the structure of the synthesized material. As illustrated in FIG. 1, the synthesized material shows the characteristics of a carbonyl group and an ether group, and also the presence of attached hydroxyl group. Briefly, polycarbonic acid is formed, which means that fixation and storage of carbon dioxide are possible by the method according to the embodiment of the present invention.

While 0.25 g of the formed polycarbonic acid compound was heated in an atmosphere in which argon gas was allowed to flow at a flow rate of 100 cc/min, thermal decomposition behavior thereof was analyzed using a thermogravimetric analyzer. Thermogravimetric analysis was performed using a thermogravimetric analyzer with a magnetic suspension balance available from Rubotherm and with a Rubotherm heating system. Furthermore, the concentration of two kinds of materials including carbon dioxide and oxygen was measured using a quadrupole mass spectrometer (IPI GAM 400 model) and thus the generated gas was analyzed.

Figure 2:
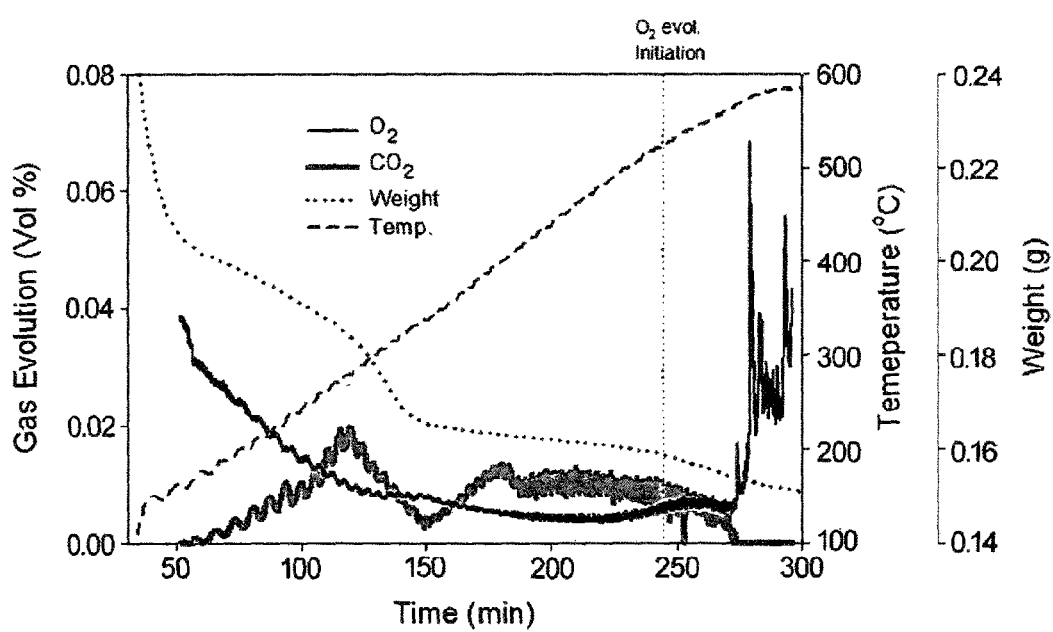
FIG. 2 illustrates thermogravimetric analysis results and gas generation results.

FIG. 2 illustrates thermogravimetric analysis results and gas generation results. As illustrated in FIG. 2, as the temperature increases, carbon dioxide was observed to be generated from the initial heating. It seems to be produced in the course of decomposition of a polymer material having an ester group formed by condensation polymerization of carbon dioxide as a target material. This may be considered to be because, when the thermal energy applied to the polycarbonic acid compound is not sufficient due to the low heating temperature, the unstable bond of the polycarbonic acid compound is broken and carbon dioxide may thus be formed, but bonding between carbon atoms requiring a predetermined amount or more of energy does not take place on account of the need for rearrangement of carbon atoms.

However, oxygen began to be generated from approximately 500° C., and at approximately 550° C., the generation of carbon dioxide was stopped and generation of oxygen was drastically increased. This may be considered to be because, when energy enough to rearrange the atoms is supplied, more stable bonds are formed by the bonding of only carbon atoms, and thus carbon dioxide is not generated anymore but only oxygen is generated to thus produce carbon.

The material thus produced was analyzed using a Raman spectrophotometer (BRUKER SENTERRA model (wave length 532 nm, power 20 mW, exposure time 100 s)). The results are illustrated in FIG. 3.

Figure 3:
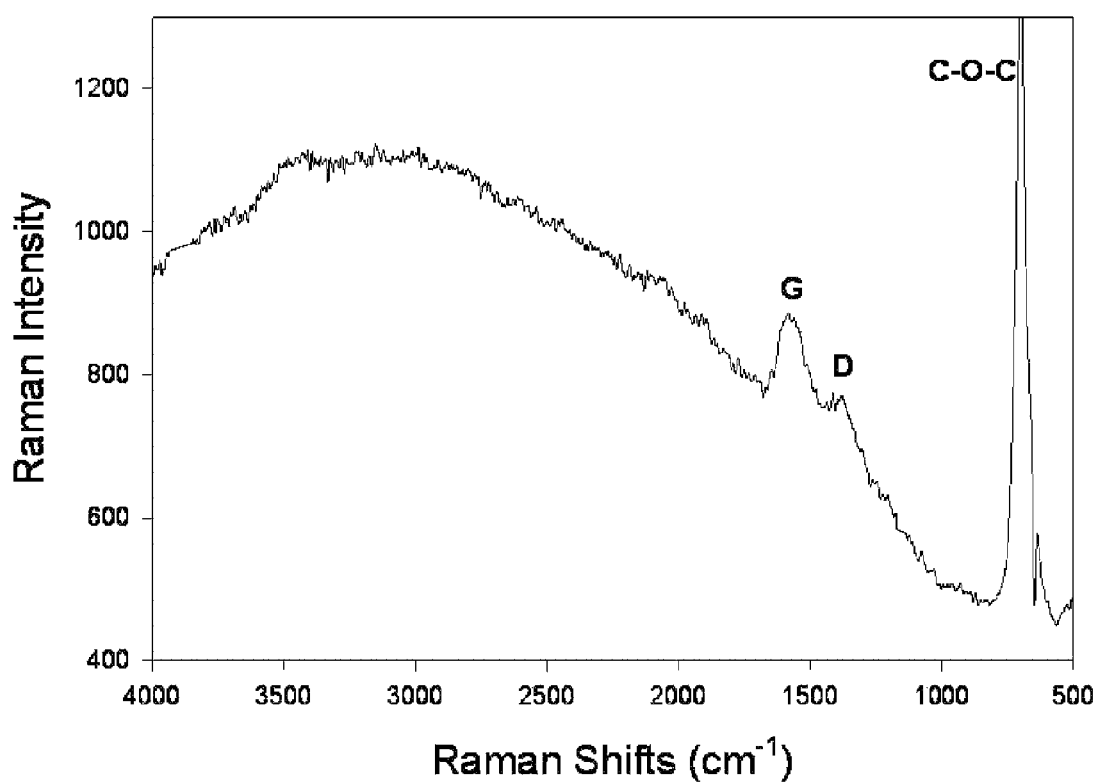
FIG. 3 illustrates a Raman spectrum of a material recovered from fixed carbon dioxide according to the present invention.

Through the graphite structure band (G) and the defective structure band (D) as illustrated shown in FIG. 3, the material produced by the embodiment of the present invention can be seen to be defective graphite.

Consequently, the method according to the embodiment of the present invention enables the carbon dioxide solidified by condensation polymerization to be recycled into carbon, thus constructing the cyclic utilization system of resources including fixation of carbon dioxide and conversion of fixed carbon dioxide into carbon.

The invention claimed is:

1. A method of fixing carbon dioxide, comprising introducing carbon dioxide pressurized to a pressure higher than atmospheric pressure into a reactor containing a strong acid aqueous solution, so that carbonic acid resulting from dissolving the carbon dioxide in the strong acid aqueous solution is made into a polymer material by condensation polymerization, wherein the polymer material is a material represented by the following Chemical Formula,

[Chemical Formula]

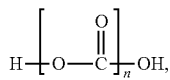

wherein n is an integer greater than or equal to 2.

2. The method of claim 1, wherein a temperature of the reactor is 20 to 100° C.

3. The method of claim 1, wherein the pressure of the carbon dioxide is 30 to 100 atm.

4. The method of claim 1, wherein the strong acid aqueous solution includes one or more selected from among sulfuric acid, nitric acid and hydrochloric acid.

5. The method of claim 1, wherein the polymer material is configured such that carbon atoms of linear molecules are partially cross-linked and thus the linear molecules are connected to each other via chemical bonding.

6. The method of claim 1, wherein the strong acid aqueous solution has a pH of 2 or less.

7. A method of recovering carbon, comprising heating the polymer material produced by the method of claim 1, thus separating oxygen and recovering carbon, from the polymer material.

8. The method of claim 7, wherein heating is performed at 500 to 1100° C.

9. The method of claim 7, wherein heating is performed at 550 to 700° C.

10. The method of claim 7, wherein the polymer material includes a carboxyl group and a hydroxyl group.

* * * * *